(12) United States Patent
Johnson

(10) Patent No.: US 6,505,444 B1
(45) Date of Patent: Jan. 14, 2003

(54) FREE STANDING MODULAR FLOOR MAT SYSTEM

(75) Inventor: Danny J. Johnson, Trenton, GA (US)

(73) Assignee: Enterprises International, Inc., Hoquiam, WA (US)

( * ) Notice: Subject to any disclaimer, the term of this patent is extended or adjusted under 35 U.S.C. 154(b) by 39 days.

(21) Appl. No.: 09/710,103

(22) Filed: Nov. 10, 2000

(51) Int. Cl.⁷ .................................................. B32B 3/06
(52) U.S. Cl. ........................... 52/177; 428/45; 428/52; 428/53; 428/54; 428/60; 15/215
(58) Field of Search .............................. 428/45, 52, 44, 428/53, 54, 60; 52/177; 15/215

(56) References Cited

U.S. PATENT DOCUMENTS

| | | | |
|---|---|---|---|
| 164,333 A | 6/1875 | Roullier | |
| 1,384,891 A | 7/1921 | Gothberg | |
| 2,436,315 A | 2/1948 | Liberatore | 15/112 |
| 3,435,480 A | 4/1969 | Mann, Jr. | 15/215 |
| 3,808,628 A | 5/1974 | Betts | 15/215 |
| 3,846,945 A * | 11/1974 | Roby | 52/177 |
| 4,029,834 A | 6/1977 | Bartlett | 428/62 |
| 4,126,006 A | 11/1978 | Lewis | 405/220 |
| 4,143,194 A | 3/1979 | Wihksne | 428/81 |
| 4,468,910 A | 9/1984 | Morrison | 52/591 |
| 4,568,587 A | 2/1986 | Balzer | 428/52 |
| 4,590,110 A | 5/1986 | Arens | 428/53 |
| 4,654,245 A | 3/1987 | Balzer et al. | 428/52 |
| 4,663,903 A | 5/1987 | Ellingson, Jr. | 52/181 |
| 4,675,222 A | 6/1987 | Berndt, Jr. | 428/53 |
| 4,804,570 A | 2/1989 | Bedics | 428/53 |
| 4,877,672 A | 10/1989 | Shreiner | 428/156 |
| 4,964,187 A | 10/1990 | Dell'Orto | 15/161 |
| 5,403,637 A | 4/1995 | Pickard et al. | 428/44 |
| 5,958,538 A | 9/1999 | Kessler | 428/45 |
| 5,992,105 A | 11/1999 | Kessler | 52/177 |
| 6,042,915 A | 3/2000 | Kessler | 428/45 |

FOREIGN PATENT DOCUMENTS

| | | | |
|---|---|---|---|
| EP | 507415 B1 | 10/1992 | |
| GB | 315898 | 7/1929 | |
| GB | 1605028 | 12/1981 | A47G/27/02 |
| GB | 2080105 | 2/1982 | A47G/27/02 |

\* cited by examiner

*Primary Examiner*—Alexander S. Thomas
(74) *Attorney, Agent, or Firm*—Seed IP Law Group PLLC

(57) ABSTRACT

A free standing modular mat system for creating various selectable combinations of mat configurations at the site of installation, first and second mats having parallel ribs on the bottom and parallel spaced ribs on the top at right angles to the bottom ribs, a top connector having a body attached to the first mat and an elongated downwardly facing groove running parallel to the first mat, a bottom connector attached to the second mat and extending outwardly along the second mat toward the first mat, the connectors having interengaging mating grooves formed with interfering interlocking enlarged tips extending into the grooves, the end of the mat system may terminate in a transition piece having an angled surface supported by downwardly projecting spaced flexible flanges and the transition piece terminating in a solid tapered tip.

19 Claims, 4 Drawing Sheets

FREE STANDING MODULAR FLOOR MAT SYSTEM

TECHNICAL FIELD

In general the invention relates to a free standing modular floor mat system and connectors for selectively interconnecting modular mats to form a longer or wider or other variable size mat system and to transition pieces for the ends of the mat system.

SUMMARY OF THE INVENTION

A free standing modular floor mat system provides a non-slip modular system that provides a safe, self draining surface with endless configuration capabilities. The floor mat can be placed anywhere, without any modification to the existing floor and thus is free standing. The floor mat system can be easily identified to fit any area regardless of size. The floor mat system can be pre-configured at the factory eliminating any installation tools, contractors, etc at the site of installation. The typical floor mat system components are manufactured from semi-rigid, plasticsized, virgin polyvinyl chloride or extruded rubber and annealed to withstand inclement weather, harsh environments, heavy traffic, and resist damage when exposed to harsh chemicals. The floor mat system can be modified to include carpet strips, or other absorbent strips to increase drying effect. This invention uniquely provides a quick and secure interlocking system for easily positioning a number of the modular floor mats to make a larger mat system configuration. The mat system employs mats having parallel top ribs and parallel bottom ribs which are perpendicular to the top ribs. The mats have lengthwise and widthwise ends which are then joined together by upper and lower connectors.

Prior art connectors for mat systems have used separate multiple connectors for attaching one modular mat to another. These separate spaced connectors have not worked in practice because they get lost or make re-installation difficult in achieving proper alignment between adjacent mats after lifting the modular mats out of a system.

In this invention the connectors run all or substantially all of the length of the end of a modular mat. A lower connector has an upwardly facing groove and an upper connector has a lower facing groove. The grooves of each connector have an inwardly protruding tip on one leg of the groove to provide an interference but releasable interlocking interconnection between the mating connectors. The connectors can be snapped onto the mat or permanently bonded or preferably cold welded to the mat.

Another feature of the invention relates to transition pieces place at the ends of the mat system for rolling objects or allowing people to walk up onto the mat system. Prior art transition pieces have generally been made of rigid metal or solid plastic or rubber. These prior art transition pieces do not provide adequate flexibility for smoothing or cushioning the movement of objects up onto the matting system. In this invention, the transition pieces are formed of flexible plastic or rubber material and are provided with flexible flanges on the underside of the transition piece. The flexible flanges allow for more flexing of the transition piece.

DETAILED DESCRIPTION OF THE INVENTION

Figure 1:
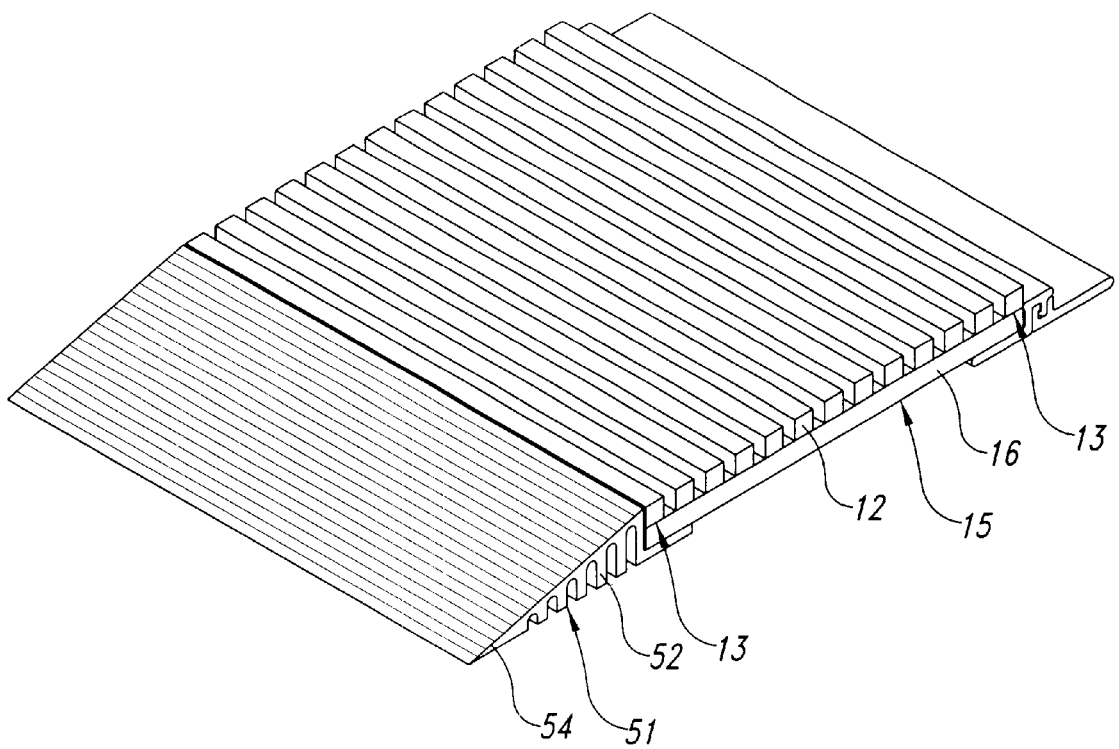
FIG. 1 is an isometric of a portion of a free standing modular floor mat system with individual mats joined together at their lengthwise or widthwise ends by connectors.

The modular mat sections to be joined have extruded or otherwise formed parallel top ribs 12 spaced far enough to allow debris, ice, snow, rain to fall through but close spacely enough to be deemed, heel and crutch proof are provided with embossed or etched upper surface. The ribs may be hollow or solid ribs. The bottom ribs 16 lying parallel to one another and perpendicular to the top ribs are fused, welded or otherwise connected to the top ribs to form cavities or pockets 18 (FIG. 5) to allow the debris, snow water to collect and be stored for later removal during cleaning. The bottom rib spacing may or may not be equal to nor similar to the top rib spacing. When necessary, top ribs may be omitted to allow placement of various widths of carpet or absorbent strip to be placed in the resulting open slots between adjacent of the remaining ribs to add additional drying. The bottom surface of the bottom rib 16 may also be embossed. The bottom ribs may also be hollow or solid. The embossing or etching of the bottom ribs reduces the chance of the floor mat slipping when under extreme lateral pressure such as in use with heavy shopping carts or buggies being pushed across the free standing modular floor mat system. The hollow, tubular rectangular ribs, as is known in the art, if used, provide a lighter weight floor mat while still granting the desired thickness and cavity underneath to allow debris to pass through without obstructing the walking surface. The mat sections each have a set of lengthwise ends 13 and widthwise ends 15.

Figure 2:
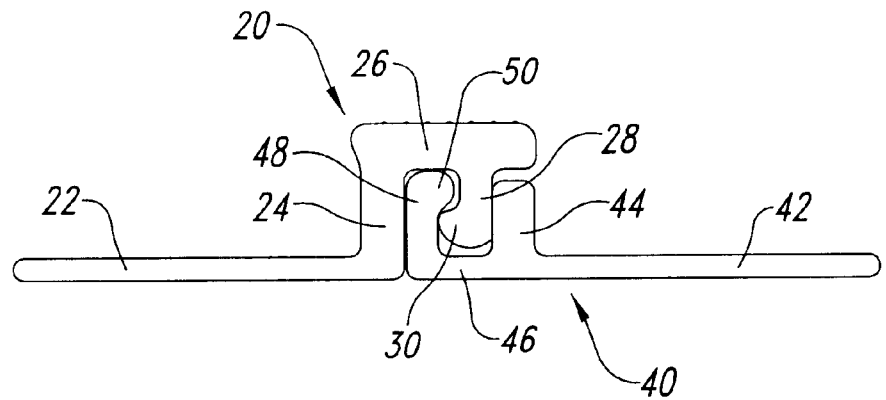
FIG. 2 is a side elevation detail of top connector and bottom connectors shown interconnected in an interference fit.

Mat connectors are best shown in FIG. 2 and include a top connector 20 having a body 22 intended to run the entire width or length of the mats to be connected. Extending up from the body is a first leg 24 connected to a top leg 26. Extending downwardly from the top leg 26 is a third leg 28. The third leg has an inwardly protruding tip 30 formed of a resilient material.

The bottom connector 40 has a body 42, a first leg 44 extending upwardly from the body, a bottom leg 46 and a third leg 48 secured to the bottom leg 46. The third leg extends upwardly and is provided with an inwardly protruding tip 50. One or both of the tips 30 and 50 are resilient to allow the two protruding tips to pass one another to provide a tight interference interlocking fit.

In the alternative, obviously the tip can be protruding outwardly from the third leg 28 of the upper connector and have an interference fit with an inwardly protruding tip on the upwardly extending leg 44 of the bottom connector.

The connectors are shown in their operative position attaching to modular mat sections to removably join the mat sections together to form the mat system. It should be understood, also that while the embodiment shown in FIG.

1 shows lengthwise ends 13 of the modular mat sections being connected, the widthwise ends 15 can also be connected. As is also well understood, the direction of the ribs on the top ribs and the bottom ribs can be reversed so that the top ribs run along the length of a corridor, for example, with the bottom ribs running across perpendicular to the length of the corridor. In the embodiment illustrated, however, the top ribs would run perpendicular to the length of the corridor while the bottom ribs would run parallel to the length of the corridor.

Figure 3:
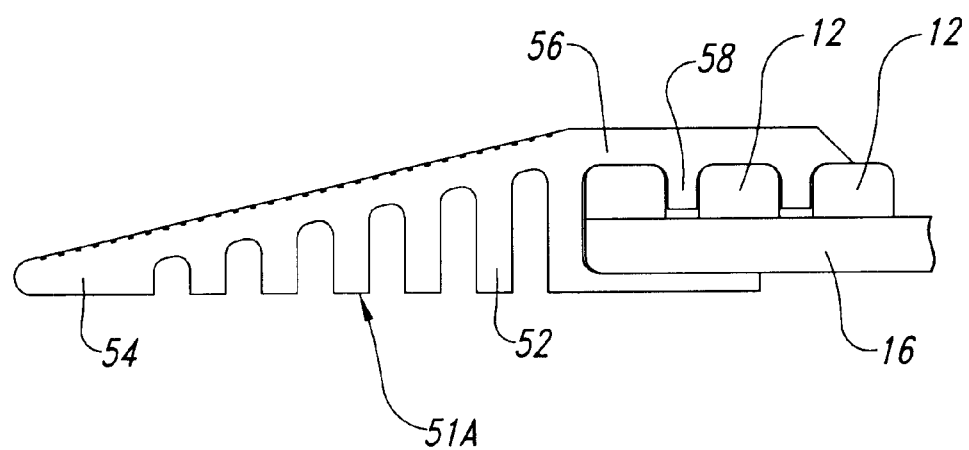
FIG. 3 is a side elevation detail of another form of transition piece.

At the ends of a mat system, transition pieces 51 are used to guide walkers or guide roller supported vehicles up onto the mat system. It is a unique feature of the transitions pieces of this invention that the transition pieces are not solid but are supported by vertical flanges 52. The transition piece terminates at a solid tapered tip 54. The transition piece is made from plastic or rubber with the flanges while flexible are still of sufficient stiffness to support a normal rolling or walking load. The flanges provide cushioning for the loads to make the transition up onto or down from the mat system easier. As shown in FIG. 1, the transition pieces are bonded to the modular mat section in the same manner as the connectors. However, the transition piece can also be snapped onto the modular mat section as an alternative form of the invention. This is best illustrated in FIG. 3 showing a transition piece 51A having an extended cap 56 with downwardly projection spaced fingers 58 that hook between the upper ribs 12.

Figure 4A:
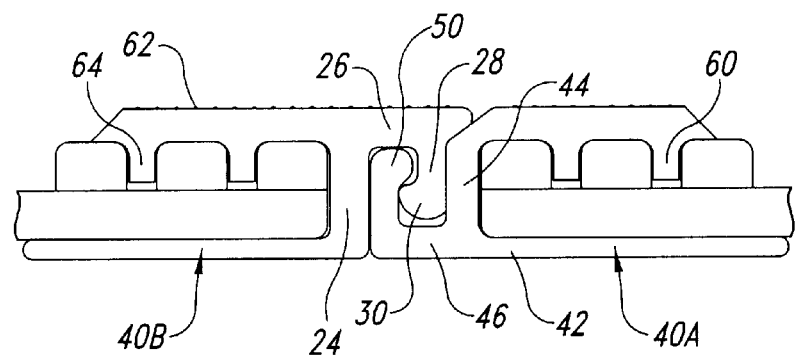
FIG. 4A is a side elevation detail of another form of top and bottom connectors.
Figure 4B:
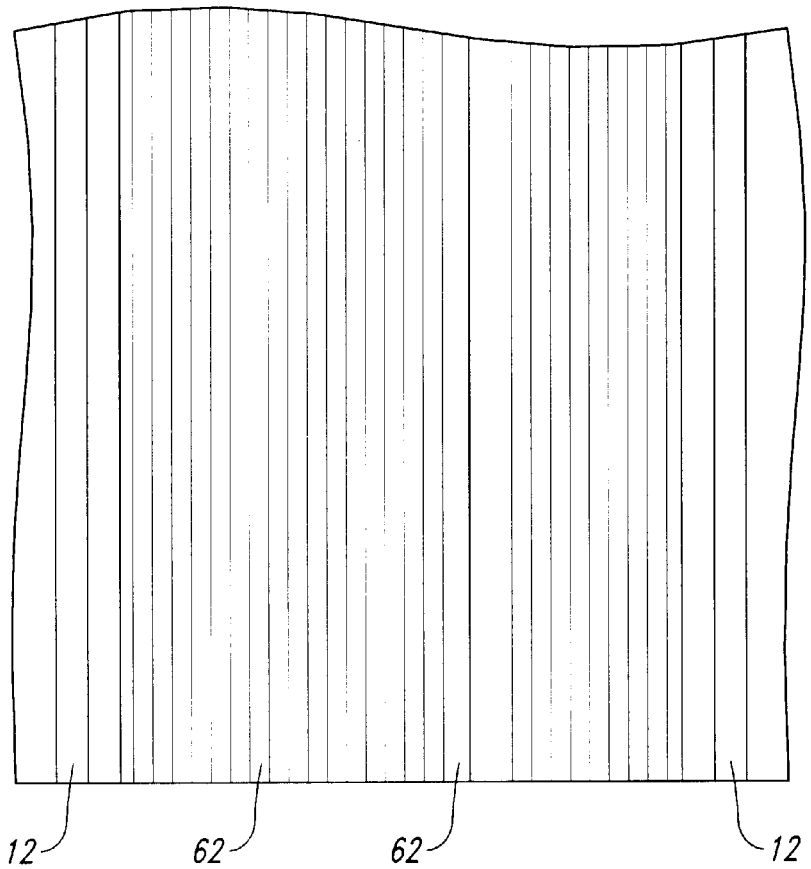
FIG. 4B is a fragmentary detail of a plan view of the embodiment of FIG. 4A.

An alternative embodiment of the connectors is also shown in FIGS. 4A and 4B. In this embodiment the connectors are snapped onto the modular mat sections rather than being bonded thereto. For this purpose the connector bottom 40A has leg 44 extended and is provided with downwardly projecting flanges 60. The top connector 40B has an extended cap 62 with downwardly projecting flanges 64 that fit with the top ribs 12. The flanges will have a close fit with the top ribs 12.

Figure 5:
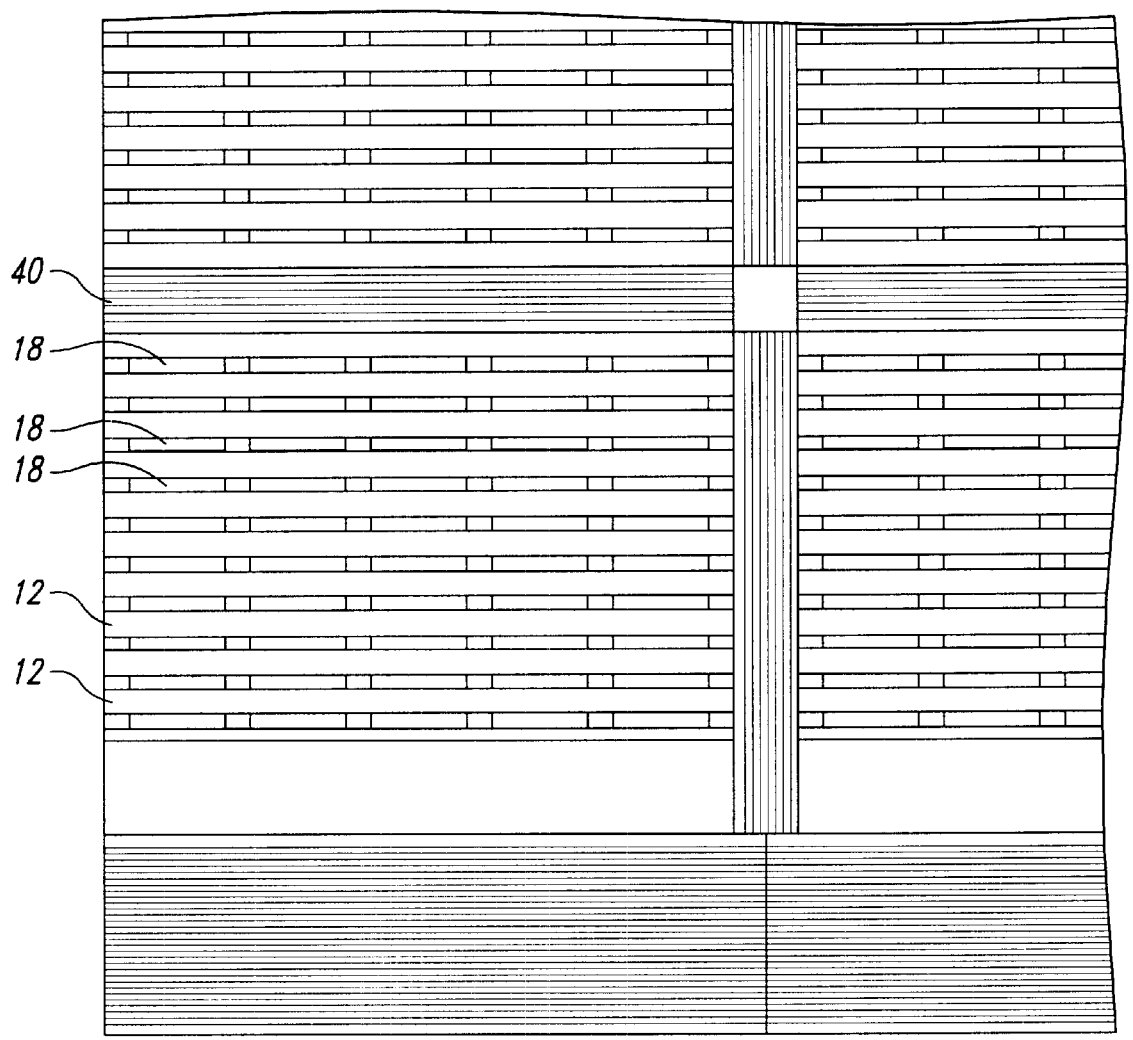
FIG. 5 is a schematic illustration of several modular mats connected both lengthwise and widthwise to make up a free standing modular mat system embodying the principles of the invention.

FIG. 5 illustrates that the modular mat sections can be joined by the connectors along lengthwise ends and widthwise ends for providing a modular mat system over a more rectangular area as opposed to a corridor.

In operation, the first step in making a free standing modular floor mat system is to determine the area (dimensions) in which the mat system will span. The type of floor mat system is defined by determining the amount of drainage or dispersal needed for the particular application. This determines which profile of the floor mat will be used. For example, an entrance flooring for a high traffic retail chain would require maximum thickness and drainage to reduce the number of times the floor mat system has to be cleaned. This would result in a higher profile version of a floor mat system. Another example would be a chemical or produce aisle in a store where a less amount of debris and drainage is required and therefore a lower profile mat would be preferred. Once the dimensions and the application are noted, the free standing interconnected modular floor mat system can be ready to be assembled at the factory. Applicable floor mating rolls, well known in the art, are selected and then cut into sections, creating modular components. These modulars are typically six feet long and four feet wide. The six foot being the width left to right of the aisle or entryway or area in which the mat is placed and the four foot is the width of the roll. Rolls can be manufactured in a variety of widths, therefore, the wider the roll width, the less number of connectors needed. The overall length of the aisle or entryway varies but they are typically thirty feet to sixty feet. At this time in the factory the connectors 20 and 40 are cold welded to the mating. A male or top connector will be attached to the end of one modular mat and the bottom or female connector will be attached to the adjacent or abutting modular mat. Cold welding is preferably performed using a cold welding paste that chemically melts the two plastics of the mat and connector together then evaporates, thus leaving a permanent bond without risk of affecting the integrity of the two joined parts. One acceptable paste is manufactured by Werner Müller GmbH Rudolf Diesel-StraBE7, D67227 Frankenthal, Germany. Each of the modulars is made up in this manner until at the interconnecting ends of the various modular mats. The last section of each mat system may employ a tapered transition strip 51 to provide a smooth inclination onto the mat. Once all the modulars are assembled and completed, they can be easily packaged and shipped to the desired location for final interconnection of the interconnecting connectors at the their installation site.

While the preferred embodiments of the invention have been illustrated and described, it should be understood the variations will be apparent to those of ordinary skill in the art. Accordingly the invention is not to be limited to the specific embodiments illustrated in the drawing.

I claim:

1. A free standing modular mat system for creating various selectable combinations of long lasting mat configurations at the site of installation, comprising;

a first mat having one set of parallel ribs on the bottom and a second set of parallel ribs on the top at right angles to the first set of ribs, the mat having first and second lengthwise ends and first and second widthwise ends;

a second mat having one set of parallel ribs on the bottom and a second set of parallel ribs on the top at right angles to the first set of ribs, the mat having first and second lengthwise ends and first and second widthwise ends;

a top connector attached to one of the first mat lengthwise or widthwise ends and extending outwardly along the first mat toward the second mat, the top connector having a body for attaching to the first mat and an elongated downwardly facing groove running parallel to the first mat end; and a bottom connector attached to a second mat end and extending outwardly along the second mat toward the first mat, the bottom connector having a body for attaching to the second mat and an elongated upwardly facing groove running parallel to the second mat end; the groove of the top mat selectively interlocking within the groove of the bottom mat for interlocking the connectors and thus interlocking the modular mats.

2. The modular mat system of claim 1 wherein said top connector groove is formed of a first leg extending upward from the connector body, a top leg, and a third leg extending downwardly from the top leg.

3. The mat system of claim 2 wherein said top leg extends beyond the third leg of the groove for abutting the third leg of the bottom connector when interlocked.

4. The modular mat system of claim 1 wherein said bottom connector groove is formed of a first leg extending upwardly from the contractor body, a bottom leg, and a third leg extending upwardly from the bottom leg.

5. The modular mat system of claim 4 wherein said top connector groove is formed of a first leg extending upward from the connector body, a top leg, and a third leg extending downwardly from the top leg, one of the first and third legs of the bottom connector having an enlarged tip protruding inwardly of the groove in the bottom connector, one of the first and third legs of the top connector also having an enlarged tip protruding inwardly of the groove in the top connector, at least one of the tips of a groove being flexible and resilient so that the two protruding tips can pass one another when interlocked but provide an interference fit once interlocked to hold the two connectors together.

6. The modular mat system of claim 5 wherein the tip of the top connector is on the third leg of the groove in the top connector and the tip of the bottom connector is on the third leg of the groove of the bottom connector.

7. The mat system of claim 5, including a traction piece attached to an end of the mat at the end of the mat system, said traction piece having an angled surface supported by downwardly extending spaced flexible flanges.

8. The mat system of claim 7 wherein the connectors and transition piece are cold welded o the mats.

9. The mat system of claim 7 wherein the connectors and the transition piece are snapped onto the mat.

10. The mat system of claim 1, each said connector groove having a shape providing an interference but removable fit with the groove of the opposite connector.

11. The mat system of claim 1, including a traction piece attached to an end of the mat at the end of the mat system, said traction piece having an angled surface supported by downwardly extending spaced flexible flanges.

12. The mat system of claim 11, said traction piece terminating in a solid tapered tip.

13. The mat system of claim 1 wherein the connectors are cold welded to the mats.

14. The mat system of claim 1 wherein the connectors are snapped onto the mat.

15. A mat system having a plurality of interconnected mats, each mat having parallel spaced top ribs and parallel spaced bottom ribs at right angles to the top ribs, the mat system having a terminal end wherein the mats are interconnected by top and bottom connectors, the top connector having a connector body joined to a first mat end and a groove running parallel to the first mat end, wherein said top connector groove is formed of a first leg extending upward from the connector body, a top leg, and a third leg extending downwardly from the top leg, the bottom connector having a connector body joined to a second mat end and an elongated upwardly facing groove running parallel to the second mat end, one of the first and third legs of the bottom connector having an enlarged tip protruding inwardly of the groove in the bottom connector, one of the first and third legs of the top connector also having an enlarged tip protruding inwardly of the groove in the top connector, at least one of the tips of a groove being flexible and resilient so that the two protruding tips can pass one another when interlocked but provide an interference fit once interlocked to hold the two connectors together; and a transition piece joined to the mat at the terminal end of the mat system, the transition piece having an angled surface, the angled surface being supported by a plurality of parallel spaced flexible downwardly extending flanges, the flanges oriented at least substantially parallel to the terminal end to allow the transition piece to flex.

16. The mat system of claim 15 wherein the transition piece and the connectors are permanently fixed to the mats.

17. The mat system of claim 15 wherein the transition piece is permanently welded to the mat.

18. The mat system of claim 15 wherein the transition piece is snapped onto the mat.

19. The mat system of claim 15 wherein the transition piece terminates in a solid tapered tip.

* * * * *